Aug. 14, 1923.

C. R. PRATT 1,465,234

MACHINE TOOL, CHUCK, AND CHUCKING SYSTEM

Filed July 16, 1920     5 Sheets-Sheet 1

Inventor:
Charles R. Pratt,
by Emery Booth Janney & Varney.
Attys

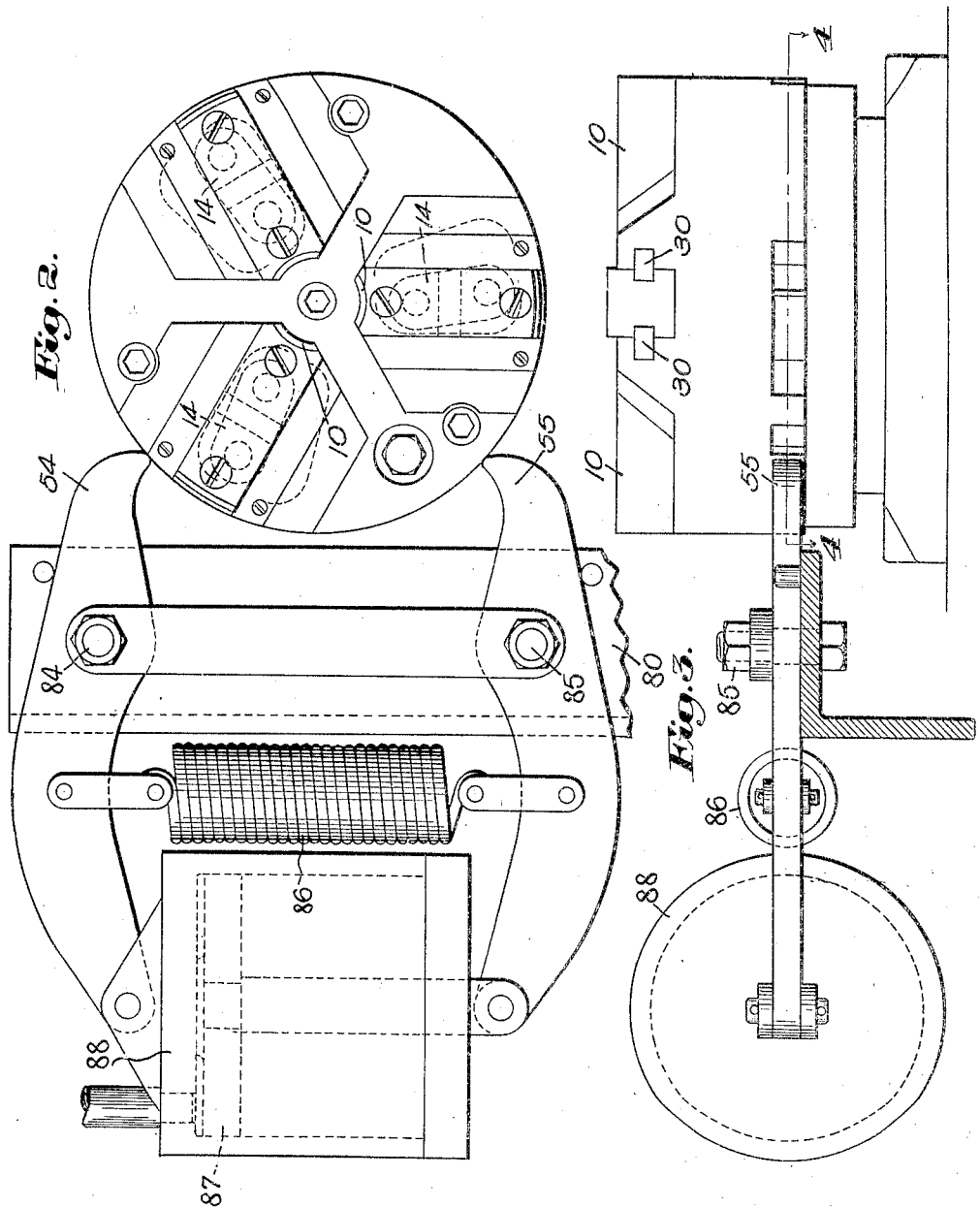

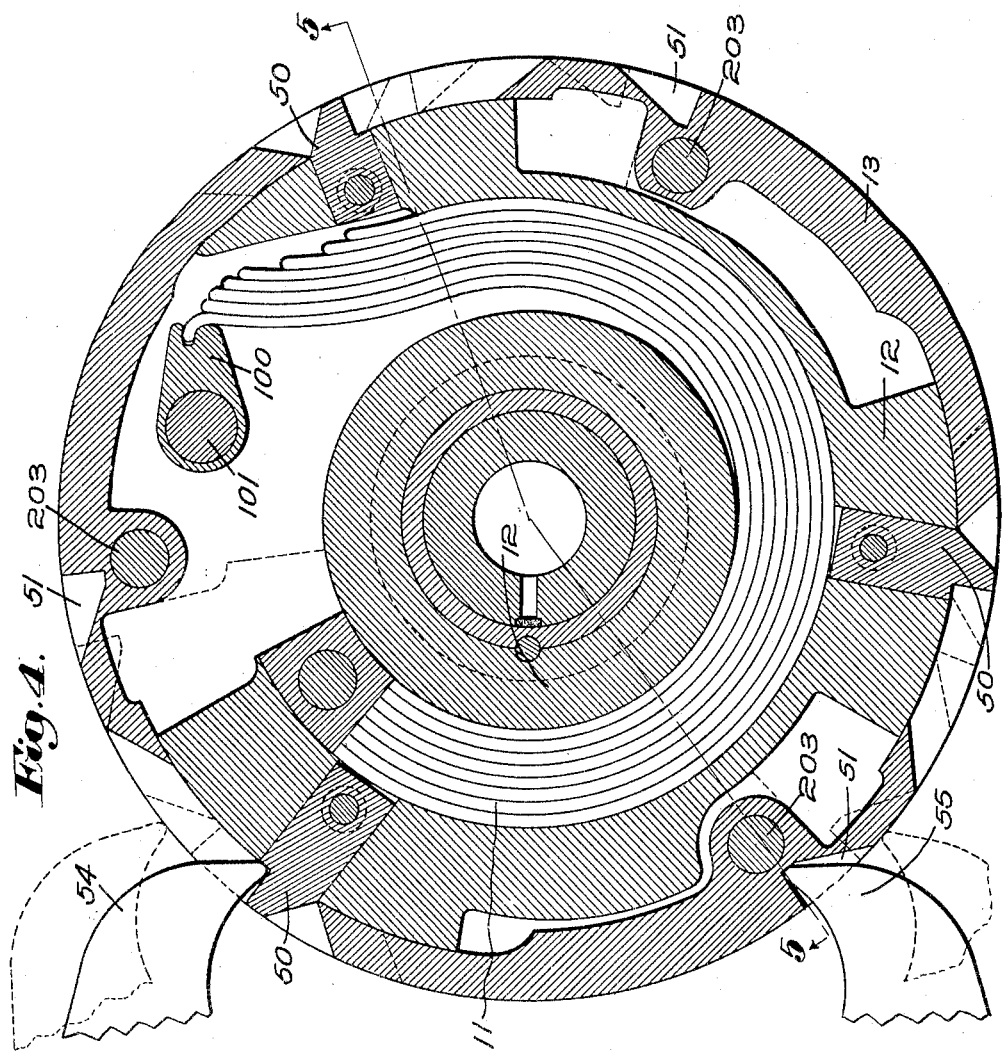

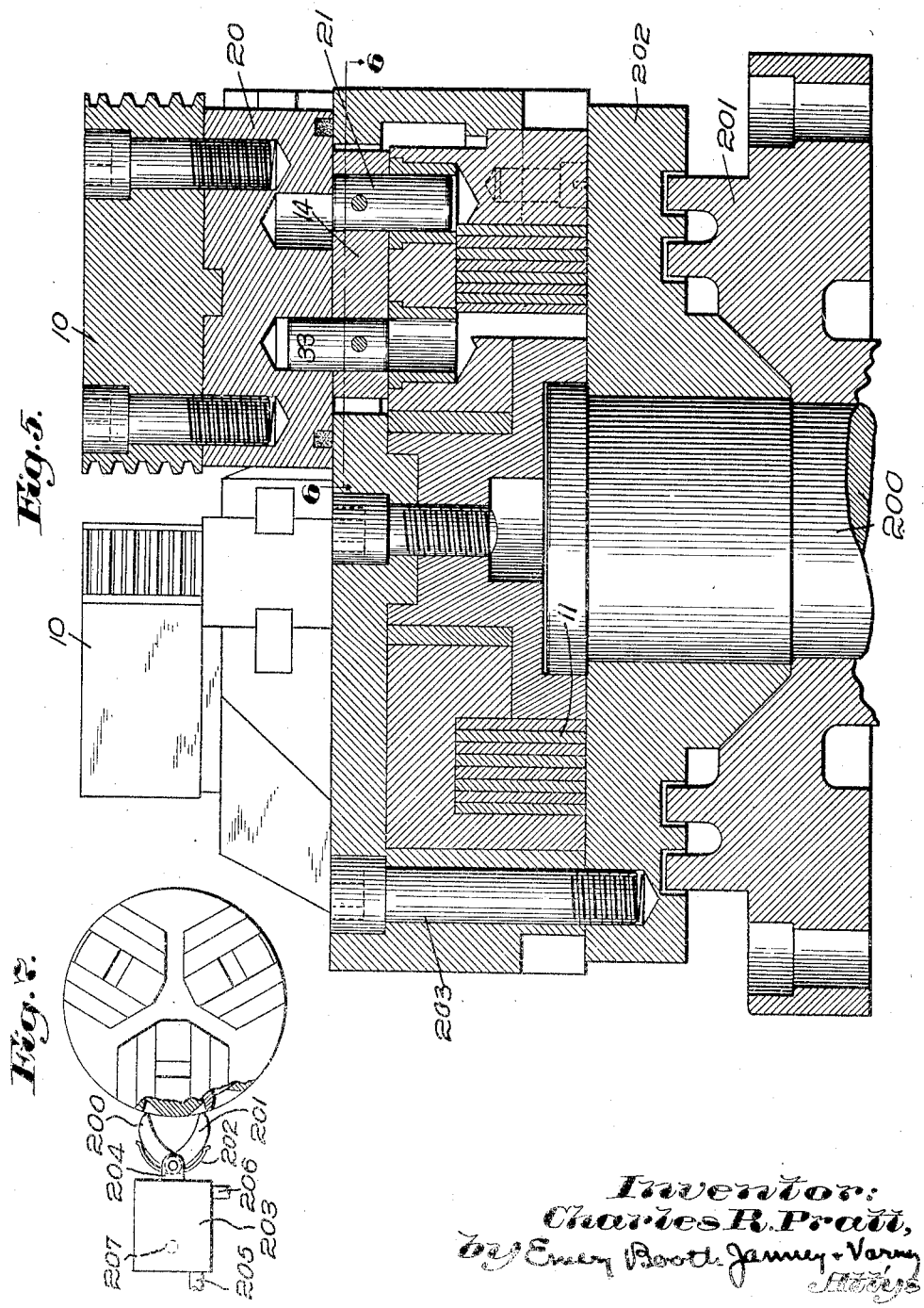

Aug. 14, 1923.  
C. R. PRATT  
1,465,234  
MACHINE TOOL, CHUCK, AND CHUCKING SYSTEM  
Filed July 16, 1920  5 Sheets-Sheet 5
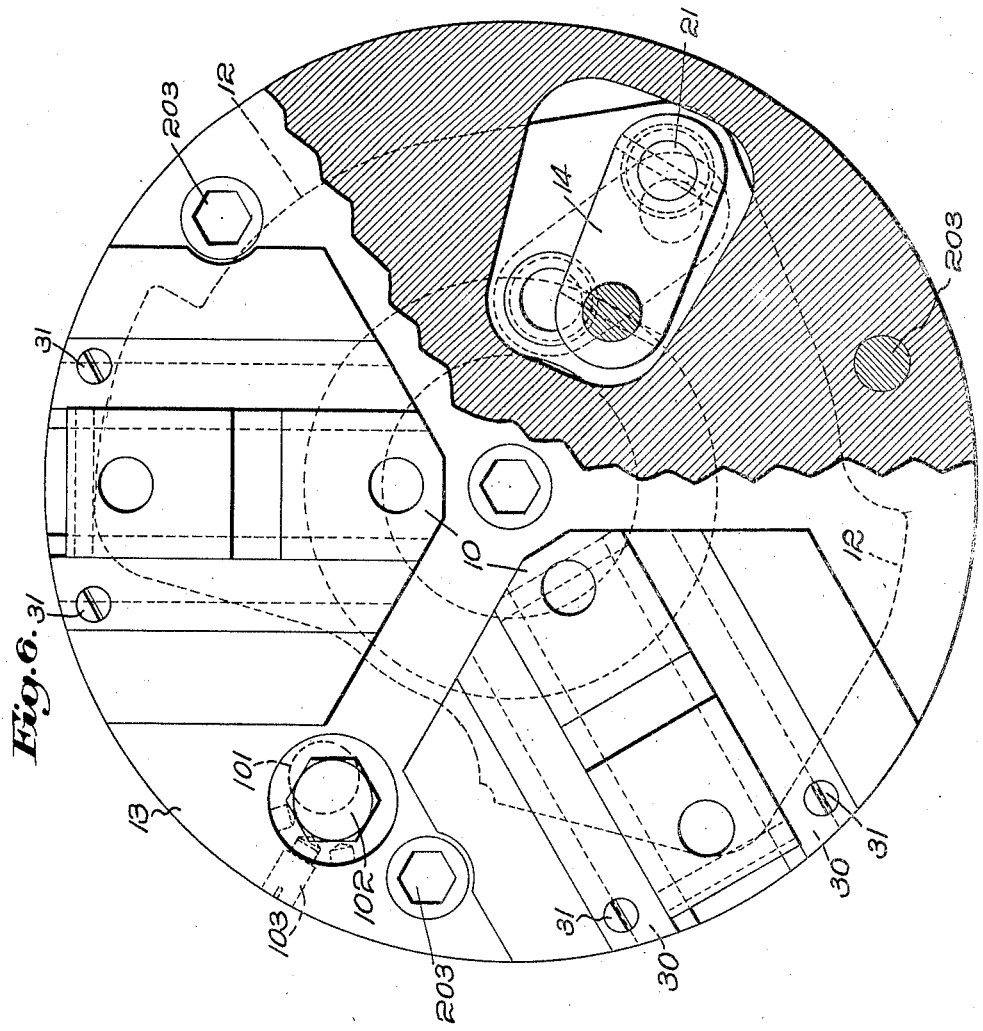
Inventor:  
Charles R. Pratt.  
by Emery Booth Janney Varney  
Attys.

Patented Aug. 14, 1923.

1,465,234

UNITED STATES PATENT OFFICE.

CHARLES R. PRATT, OF MONTCLAIR, NEW JERSEY, ASSIGNOR TO THE E. HORTON & SON COMPANY, OF WINDSOR LOCKS, CONNECTICUT, A CORPORATION OF CONNECTICUT.

MACHINE TOOL, CHUCK, AND CHUCKING SYSTEM.

Application filed July 16, 1920. Serial No. 396,807.

*To all whom it may concern:*

Be it known that I, CHARLES R. PRATT, a citizen of the United States, and a resident of Montclair, in the county of Essex, State of New Jersey, have invented an Improvement in Machine Tools, Chucks, and Chucking Systems, of which the following description, in connection with the accompanying drawings, is a specification, like characters on the drawings representing like parts.

This invention pertains to improvements in machine tools, and more particularly to improvements in chucking, chucking systems and chuck-operating mechanism. It is among the objects of my invention to improve the machines, parts and systems above mentioned.

In the drawings, which show a preferred form of one illustrative embodiment of my invention:—

Fig. 2 is an enlarged plan view of one of the chucks shown in Fig. 1 and of the chuck-operating mechanism;

Fig. 3 is a side elevation of the parts shown in Fig. 2;

Fig. 4 is a horizontal section on the line 4—4 of Fig. 3, being partly in elevation;

Fig. 5 is a vertical section on the line 5—5 of Fig. 4; and

Fig. 6 is a plan view of a chuck, being partly in section, on the line 6—6 of Fig. 5.

Fig. 7 is a plan view showing a modified chuck-operating device.

Figure 1:
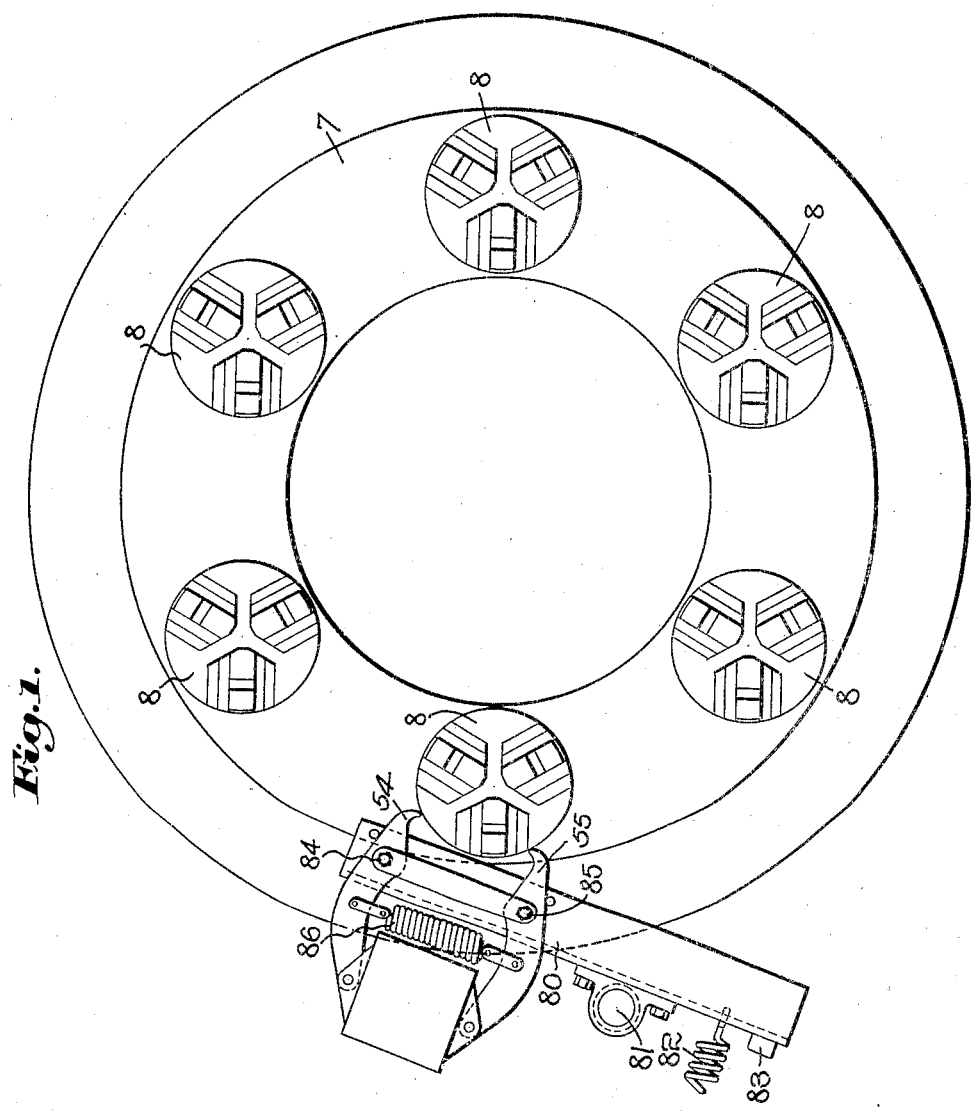
Fig. 1 is a diagrammatic plan view of a Bullard "Mult-au-Matic" lathe turret, having six chucks and provided with a preferred form of my chuck-operating mechanism.

Referring to the drawings, and particularly to Fig. 1, I have shown a turret 7 which carries six chucks 8, the turret provided with any suitable mechanism for progressively presenting the chucks at the loading station where the chuck-operating mechanism is illustrated. Various machining operations may be carried on at the other five stations, and as the turret progressively rotates by step-by-step movements of 60° each, the work arriving at the loading must be removed from the chuck and new work substituted.

The preferred form of chucks preferably used in connection with my invention and illustrated in the drawings resembles somewhat those shown in my co-pending applications Serial Numbers 386,493, and 386,494, filed June 4th, 1920, including a plurality of work-gripping jaws 10 (Figs. 2 and 6) actuated in work-gripping direction by a spring 11 (Fig. 4) which tends to oscillate a spider 12 (Figs. 4 and 6) in clockwise direction relative to the chuck body 13, thereby straightening toggles 14 (Figs. 2 and 6) connected at one end to the spider and at the other end to the jaws 10 through slide jaws 20, 20, which may be as illustrated guided in the face of the chuck body.

Where the connections of the toggles 14 to the spider are at the outer ends of the toggles as illustrated at 21 in full lines in Fig. 6, the connection to the jaws being at the inner end of the toggles (Fig. 5), the action of the spring 11 turning the spider clockwise relative to the chuck body will move the jaws toward the axis of the chuck for external chucking of the work, while if the toggle connections be reversed as shown in dotted lines in Fig. 6, the jaws will move away from the axis of the chuck for internal chucking of the work.

The reversal of the toggles may be very conveniently effected in the chuck construction illustrated because the jaw rabbets 30 (Figs. 3 and 6) are removable pursuant to removal of the rabbet holding screws 31, thus permitting the slide jaws 20 to be removed in a direction parallel to the axis of the chuck and exposing the full width of the toggles 14 so that they may be conveniently removed and reinserted in the desired relationship to cooperating parts. This also admits of the toggle pins 21 and 33 being permanently assembled with the toggle 14.

The improvements hereinbefore specifically described are useful with any type of reversible toggle chuck. I will now describe the features of my invention peculiarly, though not exclusively, useful in connection with lathes of the multiple spindle indexing turret type.

The preferred form of chuck, as shown in Fig. 4, has portions of the spider 12 accessible from the exterior of the chuck body so that external force may be applied to move the chuck body and spider one relative to the other in a direction opposed to the pressure of the spring 11.

To this end, I have in the preferred form of my invention illustrated provided the spider with lugs 50 projecting into slots through the chuck body, and I have provided the chuck body with notches 51 so that any suitable chuck-operating means may be brought to bear to produce the desired relative movement of chuck body and spider. Thus chuck-operating means may, as illustrated, include grapple or pinching elements 54, 55 adapted to engage the spider and chuck body respectively and adapted to move them one relative to the other.

It is of marked advantage to exclude water and chips from the chuck body and to close the slots through which the lugs 50 extend, I have made round and close fitting the adjacent interior surfaces of the chuck body rim and have shown the adjacent portions of the spider as arcs of circles closely fitting the interior surfaces of the rim.

The lugs 50 may conveniently be squared, the holes therefor being broached through the flange of the spider which is exterior to the spring 11 and which preferably performs the function of controlling the effective spring pressure as illustrated and claimed in my co-pending application.

I will now describe the preferred form of chuck-operating mechanism, this being illustrated in Figs. 1, 2 and 3. Referring to Fig. 1, I prefer to mount the chuck-operating mechanism so that it may not interfere with turning of the indexing turret 7, which in the preferred form of my invention illustrated progressively advances the spindles and chucks carried thereby in a clockwise direction. I have therefore mounted the chuck-operating mechanism on a support 80 carried on a pivot 81 and adapted to be held in operative relation to the chuck, which is at the loading station, by yielding means typified by the tension spring 82, an excess of spring-actuated movement thereof being opposed by the stop 83.

The chuck-engaging parts 54 and 55 are pivoted to the support 80 at 84 and 85 respectively, normally being held in chuck-releasing position by a tension spring 86. To actuate the parts 54 and 55 (which, as already described, impart relative movement to the chuck body and spider to actuate work-releasing movement of the jaws) I may provide any suitable means, but preferably, as shown, pressure fluid means including a piston 87 and its cylinder 88, best shown in Fig. 2.

Assuming the parts are in the position illustrated in Fig. 1, with new work already inserted in the chuck, the indexing of the table will move the chuck at the loading station toward the left. If the chuck-engaging part 54 is entered in a notch in the chuck body, it will be disengaged because, as the turret turns in clockwise direction, the chuck will turn on its axis in contra-clockwise direction until clear of the chuck-operating mechanism, the chuck-operating mechanism swinging out of the path of the chuck. As the chuck next to the right moves into the loading station, the chuck-operating mechanism may, in case of interference, swing back somewhat out of the path of the chuck. The operator may grasp the work in the chuck, turning it somewhat if necessary until the chuck-engaging parts 54 and 55 are entered in their proper notches in the periphery of the chuck, one engaging the chuck body and the other the spider. The operator now admits air to the cylinder 88 by opening a valve, this preferably being foot or pull-controlled so that the operator can use both hands in removing the finished work from the chuck. The admission of air to the cylinder forces the outer ends of the levers 54, 55 apart, thereby moving the chuck body and spider from the relative positions shown in dotted lines in Fig. 4 to the relative positions shown in solid lines therein. The relative movement of spider and chuck body, operating through the toggles 14, retracts the work-holding jaws from the work so that the operator can easily remove the finished work and insert new work. After inserting the new work, the operator exhausts the air from the cylinder 88, preferably by removing his foot or knee from the valve-controlling lever, not shown, thus permitting the levers 54 and 55 to resume their dotted positions as shown in Fig. 4, and permitting the spring 11 to oscillate the spider 12 and, through the toggles 14, to press the jaws against the new work, thereby completing the cycle of operation.

The abutment 100 (Fig. 4) for the end of the spring 11 connected to the chuck body is preferably, as illustrated, mounted for swinging movement about its fulcrum 101, thereby minimizing loss of spring power through friction. The fulcrum 101 is preferably provided, as illustrated, by an eccentric portion of an adjustment pin 102 (Fig. 6), which may have a polygonal head engageable by a wrench and which may be held in adjusted position by a set screw 103 entering recesses in the pin 102 so that the initial stress of the spring 11 may be set, and varied, if desired, for different classes of work.

The mounting of the chucks is best shown in Fig. 5, wherein the spindle 200 of the "Mult-au-Matic" lathe is shown projecting from the bearing part 201 bolted to the turret 7, the chuck support 202 keyed to the spindle 200 being one of the standard face plates of the lathe, and the chuck being bolted thereto by bolts 203, three in number, as best shown in Figs. 4, 5 and 6.

All joints of the chuck are preferably rendered as water and dust-tight as practicable, either by close fits or by packing. The interior of the chuck may conveniently be replenished with grease when the jaws are removed to change the toggle adjustments from internal to external chucking, or vice versa.

In Fig. 7 I have shown a chuck-operating device wherein a toggle is provided, the toggle link 200 engaging the chuck body and toggle link 201 engaging the spider. A spring 202 holds the toggle links normally in their most flexed position illustrated. The cylinder 203 contains a piston connected to the piston rod 204 which carries the toggle. Admission of air or the like at 205 forces the toggle against the chuck and, as the toggle straightens, relative movement of chuck body and spider releases the work from the chuck jaws. After exhaust of pressure fluid from 205, the toggle may be retracted by admitting air at 206, though return may be more simply actuated by a spring tending to move the piston toward the rear of the cylinder when pressure fluid is exhausted. The entire device may be mounted on a pivot 207, the air connections being flexible. A line through the axis of the cylinder, and through the axis of the chuck at the loading station may cross the axis of the turret or may pass to the left thereof as viewed in Fig. 1. In the latter case, pressure of the chuck-operating device if left on until the turret starts will assist starting thereof. No damage results if the pressure is left on in either case, as the chuck is free to revolve and the chuck-actuating device is free to swing.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims.

1. Chuck mechanism comprising, in combination, a chuck body, work-gripping jaws rotatable with said chuck body and a pressure fluid actuated jaw-operating mechanical connection operating through the rim of said chuck body for operating said jaws in at least one direction.

2. Chuck mechanism comprising, in combination, a chuck body, work-gripping jaws rotatable with said chuck body and a pressure fluid actuated jaw-operating mechanical connection operating through the rim of said chuck body for operating said jaws in work-releasing direction.

3. Chuck mechanism comprising, in combination, a chuck body, work-gripping jaws rotatable with said chuck body, spring means actuating said jaws toward the work, and power means exterior to said chuck body and independent of rotation thereof for stressing said spring and actuating said jaws in work-releasing direction.

4. Chuck mechanism comprising, in combination, a chuck body, work-gripping jaws rotatable with said chuck body, spring means actuating said jaws toward the work, and pressure fluid power means exterior to said chuck body and independent of rotation thereof for stressing said spring and actuating said jaws in work-releasing direction.

5. Chuck mechanism comprising, in combination, a chuck body, work-gripping jaws rotatable with said chuck body, and thrust means exterior to said chuck body for operating said jaws, said thrust means balanced to neutralize the turning movement of said chuck on its axis during operation of said thrust means.

6. A machine tool comprising, in combination, a plurality of spindles, a work-gripping chuck on each of said spindles, means for imparting partial step-by-step rotation to said spindles bodily through a determined path, a loading station where one of said spindles may conveniently be loaded and unloaded, and opposed thrust means acting generally in the direction of body rotation of said spindles for actuating operation of said chucks.

7. A machine tool comprising, in combination, a plurality of spindles, a work-gripping chuck on each of said spindles, means for imparting partial step-by-step rotation to said spindles bodily through a determined path, a loading station where one of said spindles may conveniently be loaded and unloaded, and opposed thrust means acting generally in the direction of body rotation of said spindles for actuating operation of said chucks to release the work.

8. A machine tool comprising, in combination, a plurality of spindles, a work-gripping chuck on each of said spindles, means for imparting partial step-by-step rotation to said spindles bodily through a determined path, a loading station where one of said spindles may conveniently be loaded and unloaded, and thrust means for actuating operation of said chucks supported for swinging movement out of the path of advance of said spindles during step-by-step movement thereof.

9. A machine tool comprising, in combination, a plurality of spindles, a work-gripping chuck on each of said spindles, means for imparting partial step-by-step rotation to said spindles bodily through a determined path, a loading station where one of said spindles may conveniently be loaded and unloaded, and pressure-fluid actuated means for opening said chucks to release and receive the work.

10. A chuck comprising, in combination, a body, jaws, a spider, link connections between said spider and jaws whereby oscillation of said spider operates said jaws, a spring urging oscillation of said spider in one direction, and means exterior to said chuck body for oscillating said spider in a direction against the strain of said spring.

11. A chuck comprising, in combination, a body, jaws, a spider, link connections between said spider and jaws whereby oscillation of said spider operates said jaws, a spring urging oscillation of said spider in one direction, and means including a toggle exterior to said chuck body for oscillating said spider in a direction against the strain of said spring.

12. A chuck comprising, in combination, a body, jaws, a spider, link connections between said spider and jaws whereby oscillation of said spider operates said jaws, a spring urging oscillation of said spider in one direction, and means exterior to said chuck body including a toggle, one end of said toggle thrusting on the chuck body and the other on said spider for oscillating said spider in a direction against the strain of said spring.

13. A chuck comprising, in combination, a body, jaws, a spider, link connections between said spider and jaws whereby oscillation of said spider operates said jaws, a spring urging oscillation of said spider in one direction, and means including a pressure-fluid actuated part exterior to said chuck body for oscillating said spider in a direction against the strain of said spring.

14. A chuck comprising, in combination, a body, jaws, a spider, link connections between said spider and jaws whereby oscillation of said spider operates said jaws, a spring urging oscillation of said spider in one direction, and means including a toggle and pressure-fluid means exterior to said chuck body for oscillating said spider in a direction against the strain of said spring.

15. A chuck comprising, in combination, a body, jaws, a part rotatable relative to the body to actuate said jaws, and a toggle exterior to said chuck body and not rotatable therewith for actuating relative rotation of said body and said part rotatable relative thereto.

16. A chuck comprising, in combination, a body, jaws, a part rotatable relative to the body to actuate said jaws, and pressure fluid means exterior to said chuck body and not rotatable therewith for actuating relative rotation of said body and said part rotatable relative thereto.

17. A chuck comprising, in combination, a body, jaws, a part rotatable relative to the body to actuate said jaws, pressure fluid means and a toggle exterior to said chuck body and not rotatable therewith for actuating relative rotation of said body and said part rotatable relative thereto.

18. A chuck comprising, in combination, a body, jaws, a part rotatable relative to the body to actuate said jaws, and thrust means exterior to said chuck body and not rotatable therewith for actuating relative rotation of said body and said part rotatable relative thereto.

19. A chuck comprising, in combination, a body, jaws, a part rotatable relative to the body to actuate said jaws, and power means exterior to said chuck body and not rotatable therewith for actuating relative rotation of said body and said part rotatable relative thereto.

20. A chuck comprising, in combination, a body, jaws, a part rotatable relative to the body to actuate said jaws, thrust means exerting force in the general direction of the axis of the chuck, means for translating said thrust into forces actuating relative rotation of said body and part rotatable relative thereto, said thrust means exterior to said chuck body and not rotating therewith.

In testimony whereof, I have signed my name to this specification.

CHARLES R. PRATT.